July 18, 1961     J. F. SAIFUKU     2,992,720
PINEAPPLE PLANT ORIENTER
Filed May 20, 1959     3 Sheets-Sheet 1
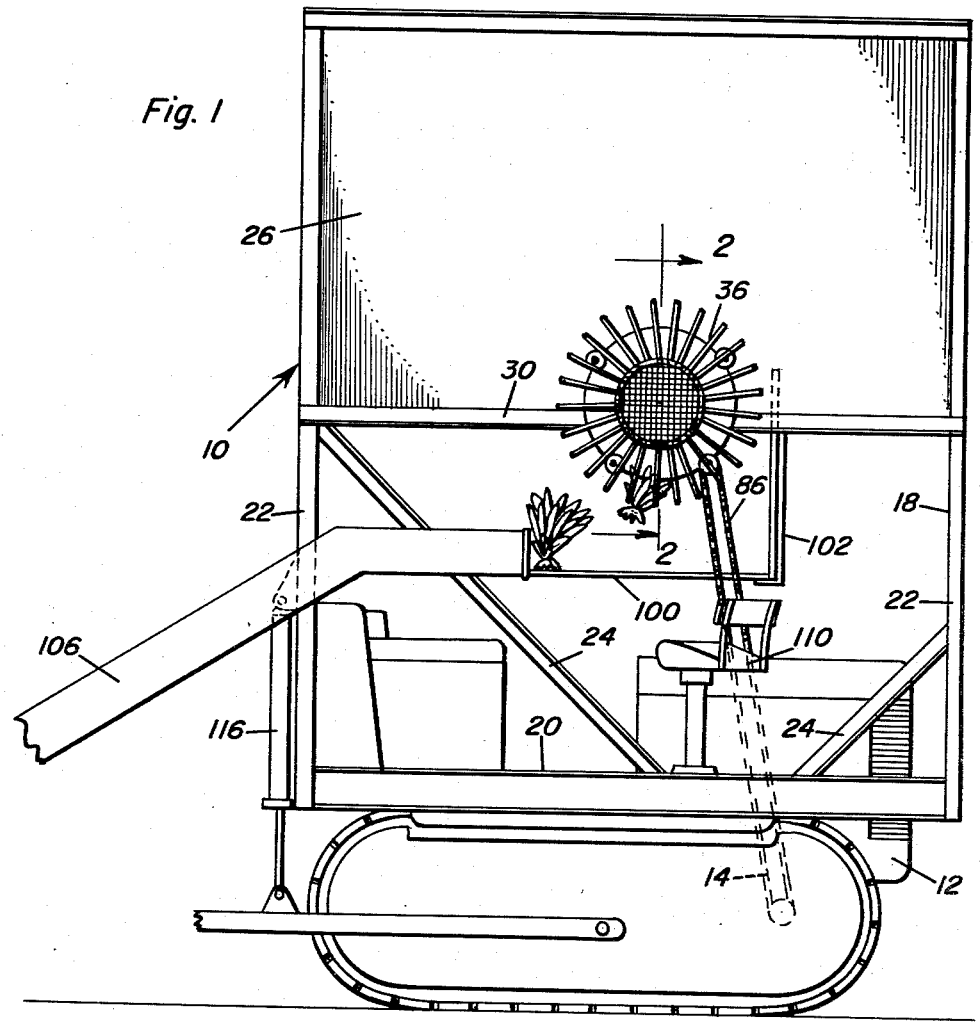
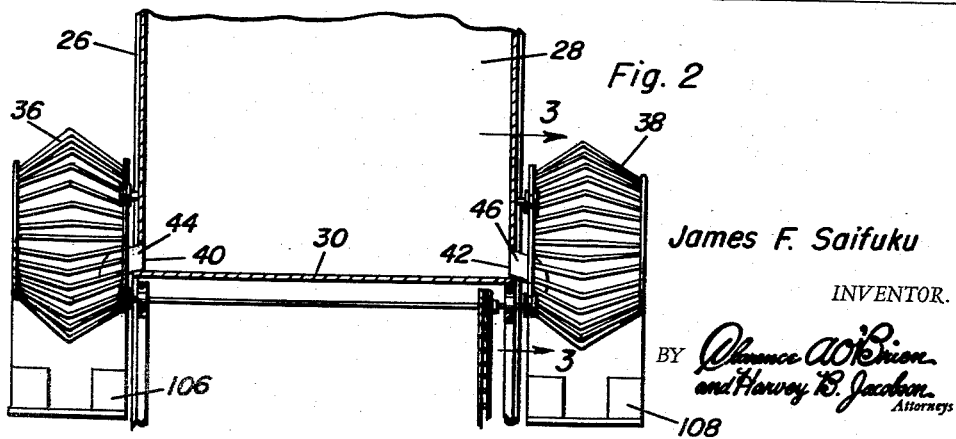
James F. Saifuku
INVENTOR.

July 18, 1961 J. F. SAIFUKU 2,992,720
PINEAPPLE PLANT ORIENTER
Filed May 20, 1959 3 Sheets-Sheet 2

James F. Saifuku
INVENTOR.

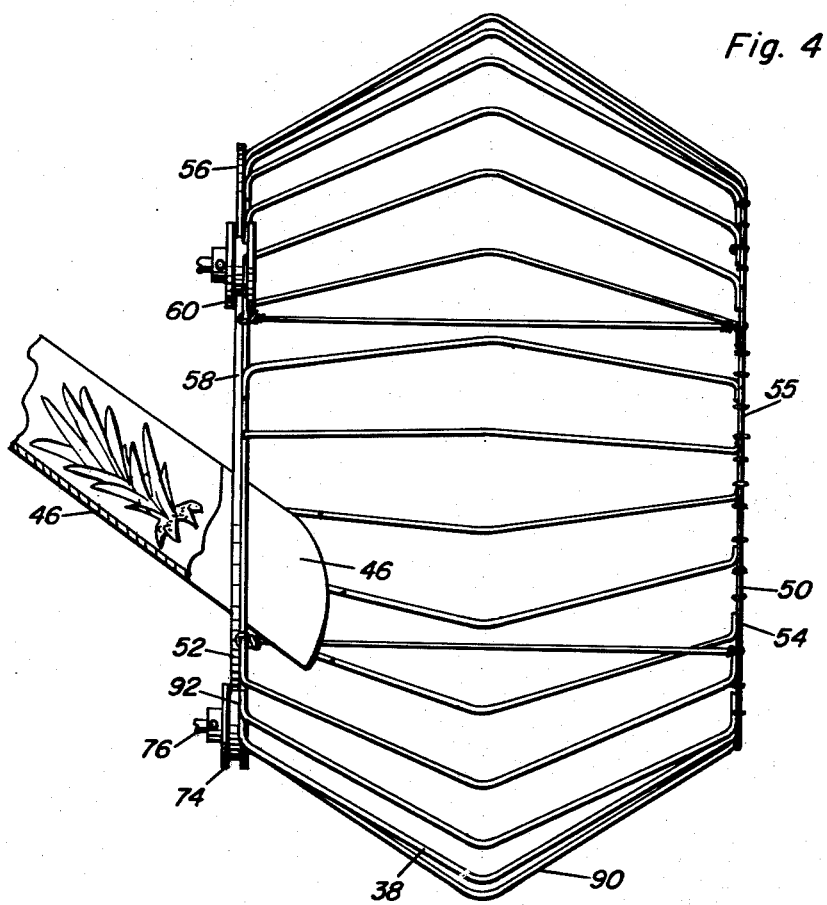
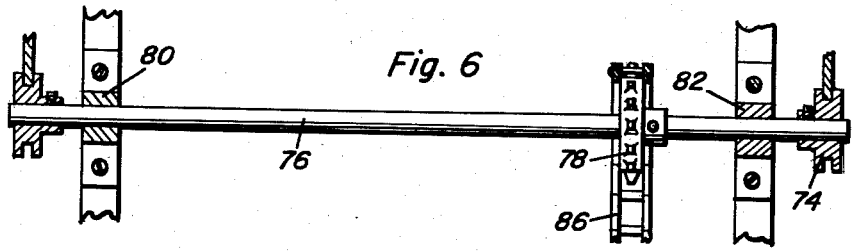

United States Patent Office 2,992,720
Patented July 18, 1961

2,992,720
PINEAPPLE PLANT ORIENTER
James F. Saifuku, 418 Kuulei St., Kailua, Hawaii
Filed May 20, 1959, Ser. No. 814,551
8 Claims. (Cl. 198—33)

This invention relates to pineapple planting equipment and more particularly to an orienting device for aiding in planting of various crops, especially pineapples.

An object of the invention is to provide a device by which to facilitate the planting of pineapples or other crops.

A further object of the invention is to provide an orienting device for a number of different crops, especially pineapples. The device is embodied as one or more, preferably a pair of orienting drums which are rotatable and which have means for orienting the pineapple sets and dropping them in the correct position for planting. This position of each set is important for successful planting.

It is preferred although not essential, that the sets be dropped on a table so that they may be manually slid down a planting chute for automatic or manual planting at the lower end of the chute. Further, it is within the contemplation of the invention to use an endless conveyor or any other type of conveyor for moving the plants to the chute inlet or to have the plants drop directly onto the inclined portion of the chute, these being alternatives within the purview of the invention.

A practical application of the invention is to have the plants drop onto the table in such position that they are manually fed to the chute inlet at a frequency within the judgment of a person or persons seated or standing adjacent to the table.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an orienting device in accordance with the invention.

FIGURE 2 is a vertical transverse sectional view taken on the line 2—2 of FIGURE 1.

FIGURE 4 is a vertical transverse sectional view taken on the line 4—4 of FIGURE 3 and partly in elevation.

FIGURE 6 is a detail vertical transverse sectional view taken on the line 6—6 of FIGURE 3.

Figure 3:
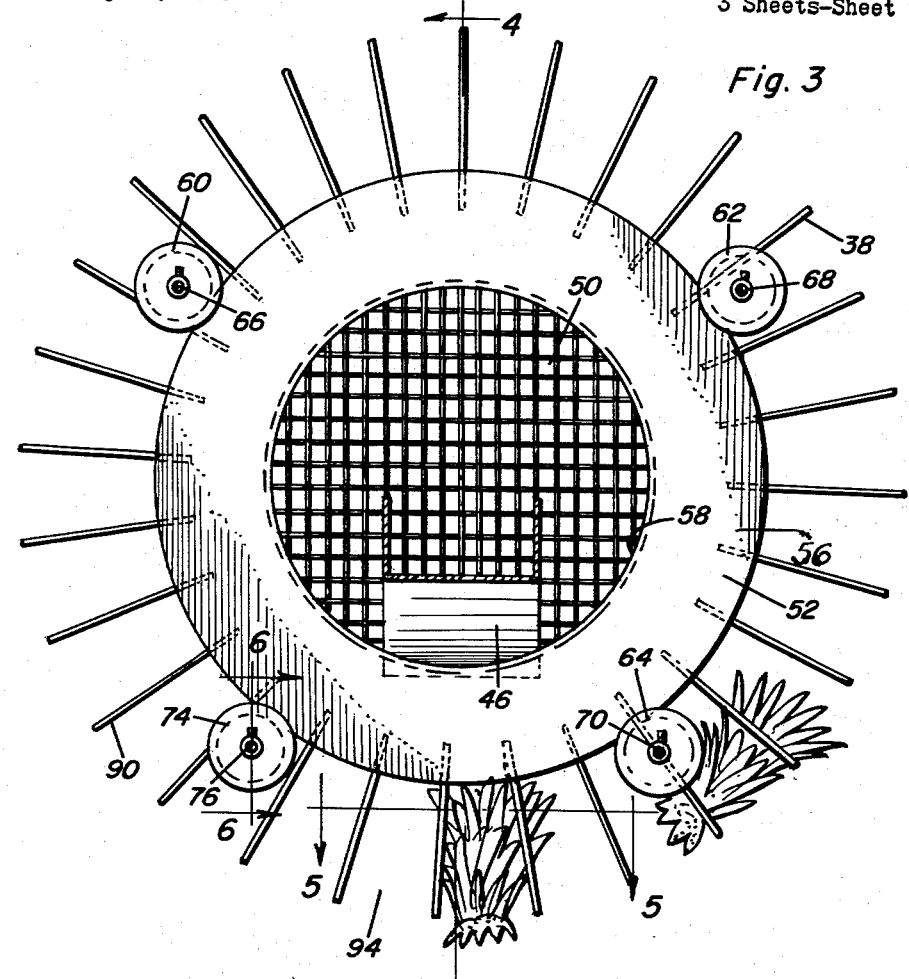
FIGURE 3 is a vertical longitudinal sectional view on enlarged scale taken on the line 3—3 of FIGURE 2.

In the accompanying drawings there is a plant orienter 10 constructed to illustrate the invention. The orienter 10 is built onto a conventional tractor 12 and obtains power from a power take-off 14 of the tractor. The power take-off may be any available source of power on the tractor and will vary in accordance with manufacturer's make and style of tractor. Therefore, power take-off 14 nearly diagrammatically represents a mechanical connection between any rotating part designed by the manufacturer to be utilized as a power take-off.

Orienter 10 is made of an upstanding framework 18 of approximately rectangular configuration. Platform 20 is mounted on the tractor and constitutes the bottom of framework 18. Corner posts 22 are secured to the platform frame, and these corner posts are braced as at 24 to the platform frame. The upper part of framework 22 has imperforate side walls 26 forming a hopper 28, see FIGURE 2, which has a bottom 30 supported by corner posts 22.

The orienter is constructed of a pair of identical orienting drums 36 and 38 mounted on the outside of the sides of hopper 28, although it is clearly evident that the orienter drums may be placed elsewhere. The hopper 28 has outlets 40 and 42 at the level of the hopper bottom 30 and opening through opposite sides of the hopper. Small chutes 44 and 46, each of which is angled downward slightly, see FIGURES 3 and 4, communicate the interior of each drum 36 and 38 with the interior of hopper 28 so that pineapple sets in hopper 28 will slide gravitationally into the interior of the two orienting drums.

Each orienting drum is mechanically driven. Typical orienting drum 38, see FIGURES 3 and 4, is made of an outer wall 50 and an inner wall 52. The outer wall is constructed of a ring 54 covered with a screen 55, while inner wall 52 is made of a circular plate 56 having a central opening 58. The chute 46 extends into central opening 58 so that the sets are deposited directly within the rotating drum 38.

A group of idler rollers 60, 62 and 64 are mounted for rotation on fixed spindles 66, 68 and 70, the spindles being secured to the sides of hopper 28 and/or to parts of the framework 22. Each idler roller is preferably V-grooved or otherwise grooved so that the periphery of plate 56 nests therein. Drive roller 74 is constructed the same as the idler rollers, but it is mounted for rotation with countershaft 76. The counter shaft has a sprocket 78 (FIGURE 6) secured to it, and it is mounted in bearings 80 and 82 secured to opposite parts of the framework 22. Drive chain 86 is engaged with sprocket 78 and with the power take-off 14 thereby rotating the countershaft 76 and resulting in rotation of both of the drums 36 and 38.

Figure 5:
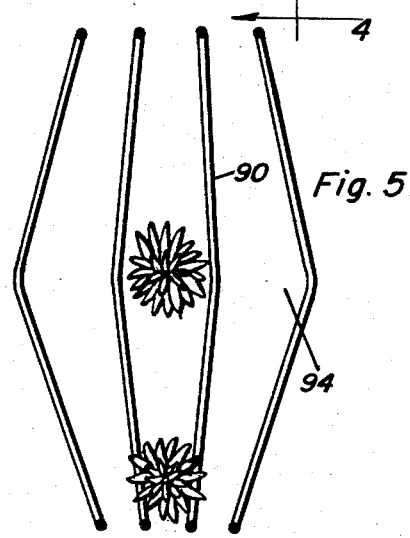
FIGURE 5 is a horizontal sectional detail view taken on the line 5—5 of FIGURE 3.

Wire cross pieces 90 are secured at their angulated ends 92 to the ring 54 and to the plate 56. Each cross piece 90 is V-shaped, and the apex portion of each cross piece is spaced farther from the adjacent cross piece than the extremities of the cross pieces. Accordingly, the spacing 94 between cross pieces (FIGURE 5) is greatest at a place where a plane would pass through the center of the orienting drum and in a direction perpendicular to the axis of rotation of the orienting drum. Therefore the cross pieces function as slides for the pineapple sets causing them to be gravitationally lowered to the previously mentioned plane at which they are dropped onto orienting table 100.

Orienting table 100 is connected by frame members 102 to the framework 22 and is located beneath the orienting drums 36 and 38. The table 100 is in registry with the inlet end of planting chutes 106 and 108. For the convenience of the workers, chairs 110 are attached to floor 20 near sorting table 100 so that as the plants are oriented and dropped onto table 100 they may be pushed down the chute 106 and/or 108.

The action of each drum is to receive the pineapple plant from hopper 28 at random. By being rotated in the drum, the heavier parts, namely the non-leafy parts of the sets seek a down position due to gravity and are slid to the space 94 between cross pieces of each drum. When in the approximately upright position (FIGURE 1) the plants drop onto table 100 so that they may be manually pushed down the planting chutes 106 and 108. The planting chutes may be adjusted by hydraulic cylinders 116.

The speed of the orienting drums may be varied. A typical speed range is between 20 and 60 r.p.m. depending on the planting speed of the planter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plant orienter comprising an orienting drum, means connected with the drum for mounting said drum for rotation, a framework with which said mounting means are operatively connected, said orienting drum having an inlet at the axis of rotation thereof, said orienting drum having sides, said inlet being in one of said sides, said sides being spaced apart, cross pieces connected to said sides and holding said sides spaced, said cross pieces each being spaced from each other to form discharge outlets about the circumferences of the orienting drum.

2. The combination of claim 1 wherein said cross pieces are each essentially V-shaped with the V-shaped apex portion being spaced apart farther from the adjacent V-shaped portion of an adjacent cross piece to form an outlet for the plants.

3. In a pineapple orienter, a framework adapted to be tractor mounted and propelled with the tractor, a hopper carried by said framework and having at least one discharge outlet at the lower part thereof, an orienting drum mounted for rotation on said framework, a table beneath said orienting drum to receive the pineapple plants, said orienting drum having an inlet in registry with said hopper outlet, and said orienting drum having spaces through which the pineapple plants are adapted to be discharged onto said table, said spaces comprising elongated openings extending transversely across said drum from one side thereof towards the other, said openings having side edges which taper in width from a minimum at the ends of the openings to a maximum intermediate their ends whereby to cause discharge of said plants in the plane passing through the openings at their maximum width.

4. In a pineapple orienter, a framework adapted to be tractor mounted and propelled with the tractor, a hopper carried by said framework and having at least one discharge outlet at the lower part thereof, an orienting drum mounted for rotation on said framework, a table beneath said orienting drum to receive the pineapple plants, said orienting drum having an inlet in registry with said hopper outlet, and said orienting drum having spaces through which the pineapple plants are adapted to be discharged onto said table, said orienting drum composed of sides, cross pieces attached at their ends to said sides and forming the periphery of the orienting drum, and said cross pieces being spaced apart farther at the intermediate portions thereof than at the end portions so that the sides of the cross pieces form slides by which to guide the pineapple plants to the wider spaced portions between cross pieces, and said wider spaced portions spacing constituting the forementioned spaces.

5. The combination of claim 4 wherein said cross pieces are each made of wire.

6. The combination of claim 5 wherein said cross pieces are each approximately V-shaped.

7. The combination of claim 4 wherein there is a second orienting drum carried by said framework, said hopper having a second outlet in communication with said second orienting drum, and means for driving said second orienting drum in unison with said first mentioned orienting drum.

8. The combination of claim 7 wherein said second orienting drum is upwardly spaced from said table so that the pineapple plants oriented and dropped from said orienting drum are received on said table.

References Cited in the file of this patent

FOREIGN PATENTS 122,988     Austria _____ May 26, 1931